United States Patent
Ishihara (10) Patent No.: US 8,019,927 B2
(45) Date of Patent: Sep. 13, 2011

(54) ELECTRONIC TAG SYSTEM HAVING BANK STATUS AND CONTROLLING METHOD THEREOF

(75) Inventor: Osamu Ishihara, Ebina (JP)

(73) Assignee: Hitachi, Ltd., Tokyo (JP)

( * ) Notice: Subject to any disclaimer, the term of this patent is extended or adjusted under 35 U.S.C. 154(b) by 403 days.

(21) Appl. No.: 12/364,857

(22) Filed: Feb. 3, 2009

(65) Prior Publication Data
US 2009/0282183 A1 Nov. 12, 2009

(30) Foreign Application Priority Data

Feb. 20, 2008 (JP) ................. 2008-038713

(51) Int. Cl.
*G06F 12/06* (2006.01)
(52) U.S. Cl. .................. 711/5; 711/E12.082
(58) Field of Classification Search ........... None
See application file for complete search history.

(56) References Cited

U.S. PATENT DOCUMENTS

| | | | |
|---|---|---|---|
| 2007/0057768 A1* | 3/2007 | Zeng et al. .......... | 340/10.1 |
| 2008/0012685 A1 | 1/2008 | Friedrich et al. | |
| 2008/0278325 A1* | 11/2008 | Zimman et al. ........ | 340/572.1 |

FOREIGN PATENT DOCUMENTS

| | | |
|---|---|---|
| DE | 20017161 U1 | 12/2000 |
| EP | 1876571 A2 | 1/2008 |
| JP | 2007-086934 | 4/2007 |
| WO | 00/31691 A1 | 6/2000 |

OTHER PUBLICATIONS

ISO/IEC 18000-6, Information technology—Radio frequency identification for item management, Part 6: parameters for air interface communications at 860 MHz to 960 MHz. Amendment 1: extension with Type C and update of Types A and B., Jun. 15, 2006.

* cited by examiner

*Primary Examiner* — Kevin Verbrugge
(74) *Attorney, Agent, or Firm* — Mattingly & Malur, PC (57) ABSTRACT

An electronic tag system, an electronic tag, and a controlling method thereof according to the present invention include an electronic tag that includes a memory having a divided band and a bank status that stores a status of data stored in the divided bank, a controlling circuit that reads and writes the data from and to the bank and changes the status and a controlling device that allows the controlling circuit connected through the electronic tag and an electronic tag reader/writer to transmit and receive the read and written data from and to the bank and issue an instruction to change the status.

15 Claims, 10 Drawing Sheets

ELECTRONIC TAG SYSTEM HAVING BANK STATUS AND CONTROLLING METHOD THEREOF

CLAIM PRIORITY

This application claims priority from Japanese patent application, JP 2008-038713 filed on Feb. 20, 2008, the content of which is hereby incorporated by reference into this application.

BACKGROUND OF THE INVENTION

1. Field of the Invention

The present invention relates to a system using an electronic tag, and more particularly to an electronic tag thereof.

2. Description of the Related Art

A system using an electronic tag (RFID tag) can provide an operation using plural electronic tags through an electronic tag reader/writer from a controlling device. In particular, values (contents) of the electronic tag can be read and an article management, etc. can be effectively performed by querying the electronic tags from the controlling device using wireless communication.

Today, specifications of the electronic tag are standardized for applying to international logistics, etc. Also, the standardized electronic tag can be accessed by using standardized protocol and is inexpensive. For this reason, it is likely that applications of the electronic tags will greatly expand. However, because the function of the electronic tags is simple, the applications thereof are limited due to the above.

The electronic tags are mounted memories in which data can be written. In the state where the electronic tags are fed over the radio, they can read and write the data stored in the memories, but if they are not fed over the radio, they cannot read and write the data in the memories.

There is a technology (JP-A-2007-86934) of dividing the memory mounted in the electronic tag into several areas (banks) and applying security management to different banks.

SUMMARY OF THE INVENTION

There is a need for an electronic tag that is suitable for various applications and convenient to use. Electronic tags having various shapes or types that are built in a card, watermarked on a paper such as a slip, etc., attached to a packing paper of an article, and the like, which are easy to use, have been developed. The use of the electronic tag depends on the handling of the data (information) stored in the electronic tag. However, there is a problem in that when the electronic tag should be applied to various applications. Although JP-A-2007-86934 discloses a bank control of the memory mounted in the electronic tag in order to improve security, it does not consider expanding the applications of the electronic tag in terms of the use of the electronic tag.

An electronic tag system, an electronic tag, and a controlling method thereof according to the present invention include an electronic tag that includes: a divided bank; a memory having a bank status that stores a status of data stored in the bank; and a controlling circuit that reads and writes the data from and to the bank and changes the status and a controlling device that allows the controlling circuit connected through the electronic tag and an electronic reader/writer to transmit and receive the read and written data from and to the bank and issues an instruction to the controlling device to change the status.

In another exemplary aspect of the present invention, the status indicates a valid state and an invalid state of the data stored in the bank.

In another exemplary status of the present invention, the controlling device issues an instruction to change the status by referring to the data stored in the bank and information on a place where the controlling device is installed.

Another exemplary aspect of the present invention installs plural data storing physical areas corresponding to the banks and selector banks storing control information for selecting one of the plural data storing physical areas in the memory and has selectors that selects any one of the plural data storing physical areas based on the control information stored in the selector bank, wherein the controlling circuit makes the data stored in the data storing physical area selected by the selector stored in the bank.

Another exemplary aspect of the present invention installs counter banks storing count values corresponding to the banks in the memory, and if the count value stored in the counter bank exceeds valid count values previously set, the controlling device issues an instruction to change a status to the status indicating that the data stored in the bank are invalid.

Another exemplary aspect of the present invention is an electronic tag ticket that includes a memory storing boarding ticket information on one of the divided banks and having a bank status that stores any one of the valid and invalid statuses of the boarding ticket information as the status of the bank and a controlling circuit outputting the boarding ticket information to a ticket gate and changes the status on the boarding ticket information stored in the bank status in response to an instruction that changes the status from the ticket gate.

Another aspect of the present invention will be easily understood from the description of "DETAILED DESCRIPTION OF THE PREFERRED EMBODIMENTS" and the accompanying drawings.

With the electronic tag, the electronic tag system, and the controlling method thereof according to the present invention, it is easy to use the electronic tag and to expand the applications of the electronic tag by handling the data (information) stored in the electronic tag.

DETAILED DESCRIPTION OF THE PREFERRED EMBODIMENTS

Figure 1:
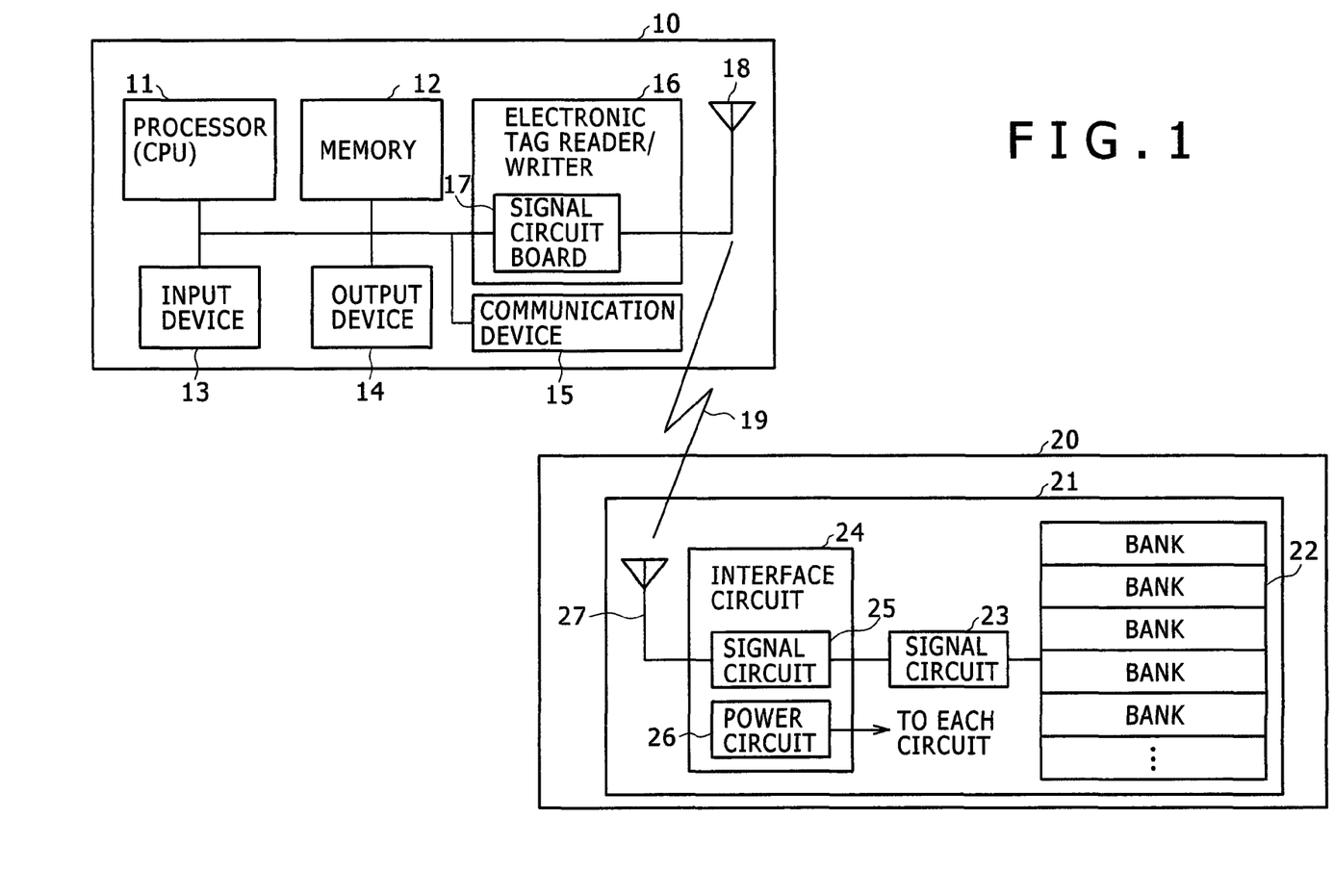
FIG. 1 is a system configuration example using an electronic tag.

Exemplary embodiments of the present invention will be described with respect to the accompanying drawings. FIG. 1 shows an example of a system configuration using an electronic tag 21. FIG. 1 shows an electronic tag 21 built in an IC-card 20 and a controlling device 10 that controls the electronic tag 21 through a communication path 19. The electronic tag 21 is not necessarily built in the IC-card 20 according to applications.

The controlling device 10 is variously corresponds to the application of the electronic tag 21 or the IC-card 20 in which the electronic tag 21 is built. For example, in the case of a boarding ticket system, the controlling device 10 is a ticketing system, a ticket gate, a ticket inspector, and the like. The control device 10 includes a processor (CPU) 11, a memory 12, an input device 13, an output device 14, a communication device 15, and an electronic tag reader/writer (hereinafter, referred to as an electronic tag R/W) 16. The electronic tag R/W 16 is a device that reads and writes commands or data from the processor (CPU) 11 to the electronic tag 21 through a signal circuit 17 and an antenna 18. If the controlling device 10 is a large system such as a ticketing system, the controlling device 10 is realized with a server calculator and the like, a memory device (not shown) such as a magnetic disk device and the like is connected to the outside, and the electronic tag R/W 16 is connected to the outside of the controlling device 10. If the controlling device 10 is a device such as the ticket gate, the input device 13 is not required, the output device 14 is a display device, and the communication device 15 is used for communicating with other devices such as a ticketing system and the like.

The electronic tag 21 includes an interface circuit 24, a controlling circuit 23, and a memory 22. The interface circuit 24 is a circuit that transmits and receives data and receives commands by an antenna 27 and a signal circuit 25 between it and the controlling device 10 and supplies power obtained from a received radio by a power circuit 26 to each circuit. The memory 22 is physically a memory circuit having a predetermined capacity and is logically managed by dividing the predetermined capacity into plural banks (memory banks). The controlling circuit 23 is a circuit that performs the control of the bank of the memory 22 and the reading and writing of the data from and to each bank according to the commands (instructions) from the controlling device 10.

Figure 2:
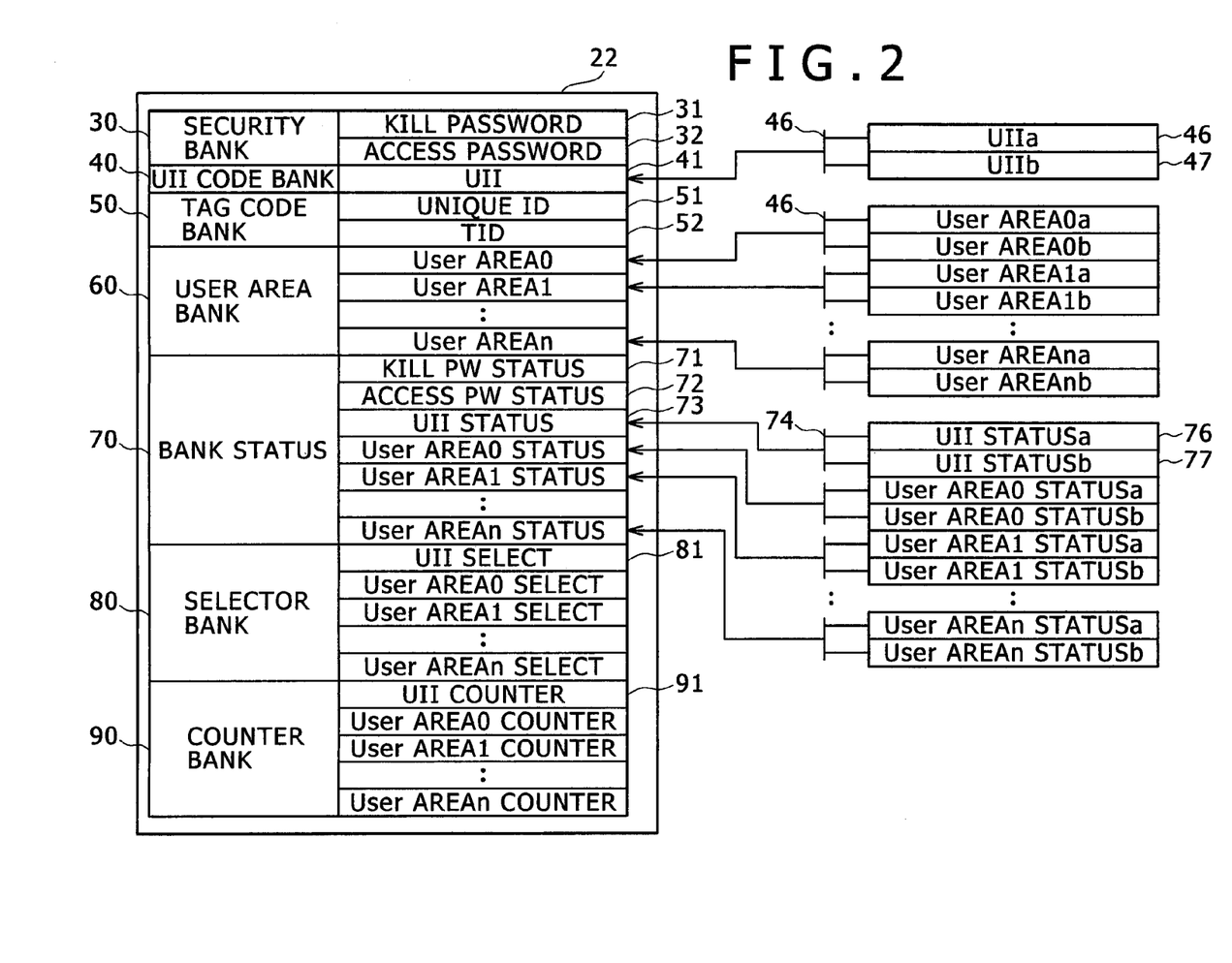
FIG. 2 is a bank configuration example of a memory.

FIG. 2 shows an example of a bank configuration of a memory 22. The bank shown in FIG. 2 is divided into a security bank 30, a UII code bank 40, a tag code bank 50, a user area bank 60, a bank status 70, a selector bank 80, and a counter bank 90.

A kill password 31 within the security bank 30 is a storing region of a password used when killing the electronic tag 21 (stops the electronic tag function). An access password 32 is a storing area of a password that is required when setting "writing disable restriction" to the UII code bank 40 and the like. FIG. 2 shows that the security bank 30 is divided into the areas of the kill password 31 and the access password 32. The area of the user area bank 60 or the bank status 70, which is to be described below, is divided in the same shape as FIG. 2. Further, in the following description, when needing not to specifically differentiate these areas, the same reference numeral refers to the storing area and the stored contents (data).

The UII code bank 40 stores a Unique Item Identifier (UII) 41 and in accessing the electronic tag 21 defined by ISO18000-6 Type C, the UII 41 is read as a response such that the reading can be easily performed. The tag code bank 50 is a storing area of a unique ID 51, which is a unique identifier to the electronic tag 21, and a storing area in which data (TID) 52 is written by a manufacturer of the electronic tag 21. Generally, a user does not use the TID 52. The user area bank 60 is divided into plural user areas (User area 0 to User area n) and controls to add "writing disable restriction" and "reading disable restriction" for each user area.

The bank status 70 is divided into a status 71 of the kill password (kill PW) 31, a status 72 of the access password (access PW) 32, a status 73 of the UII code bank 40, and an area (for example, User area 0 status) indicating a status of each user area (User area 0 to User area n) of the user area bank 60.

The selector bank 80 is divided into a UII select 81 that is an storing area of control information (selection value) to the selector 45 selecting any one of a UIIa 46 and a UIIb 47 as the UII 41 of the UII code bank 40 and a storing area (for example, User area 0 select) of control information (selection value) to a selector selecting information of each user area (User area 0 to User area n) of the user area bank 60. The UII select 81 will be described in detail as an example. Viewing from the controlling device 10, the UII 41 is logically read as the contents of the UII code bank 40. The UIIa 46 and UIIb 47 are physically provided as the UII, the selector 45 is controlled based on the control information stored in the UII select 81, and any one of the UIIa 46 and UIIb 47 is read as the UII 41. The same description is also applied to the selector (omitting reference numeral) of each user area (User area 0 to User area n) of the user area bank 60.

The counter bank 90 is a counter for repetitively using the UII 41 of the UII code bank 40 and the information of each user area (User area 0 to User area n) of the user area bank 60 up to a predetermined number of time sets, each of which is the storing areas of the counter value. The counter may be an up counter or a down counter. In a third embodiment to be described below, the down counter will be described.

The features of the above bank configuration include the bank status 70, the selector bank 80, and the counter bank 90, respectively. The bank status 70 indicates a state (the state will be described below) of a life cycle of the information that is stored in each bank managing the status, such that the electronic tag is effectively applied to a system where the meanings (values) of the information are changed together over time and during the processing, in particular, the controlling system. The time passage or the processing passage refers to the position of the electronic tag 21 (the position is designated by the installation place of the controlling device 10 controlling the electronic tag 21 or the instructions (control contents) provided to the controlling device 10), the data stored in the bank of the electronic tag 21, the status of the bank and the like and is understood by the controlling device 10.

Since the contents of each bank obtained from the results selected by the selector are selected by the selector corresponding to (controlled by the controlling device 10) situations at that time, the selector is effectively applied to applications that switches a portion of the information owned by the electronic tag 21 and uses it. Although FIG. 2 shows that one selector is selected from two pieces of information of each bank selected, the selector may be configured so that the selected physical storing area is secured in plural numbers (three or more) and the selector is selected from the plural physical storing areas. As a result, the select area installed in the selector bank 80 becomes one and the managed bank is switched as a whole according to the value stored in the area (switching all the selectors mounted according to the value of one selector), as if all the electronic tags 21 were controlled. The information owned by the electronic tag 21 can be switched as a whole according to the use (situation) of the electronic tag 21 by using the selector bank.

The counter bank 90 is effectively applied to the applications of the electronic tag 21 that repetitively uses the information stored in the bank managed by the counter. The counter bank is effectively applied to applications that allow people or plural articles to use one electronic tag 21 without limiting the temporal repetition.

Although FIG. 2 shows the electronic tag 21 and the memory 22 that includes the bank status 70, the selector bank 80, and the counter bank 90, it is preferable that one or two are selectively mounted according to applications in terms of effectively using the storing area. Further, since the selector bank 80 and the counter 90 have different contents but the same configuration, it may be permitted to divide and use the same configuration according to the applications.

Hereinafter, the operation and features of the electronic tag 21 will be described using first to third embodiments with respect to each of the bank status, selector bank, and counter bank. In order to facilitate the understandings, a boarding ticket as the application of the electronic tag 21 will be described as an example.

First Embodiment

Figure 3:
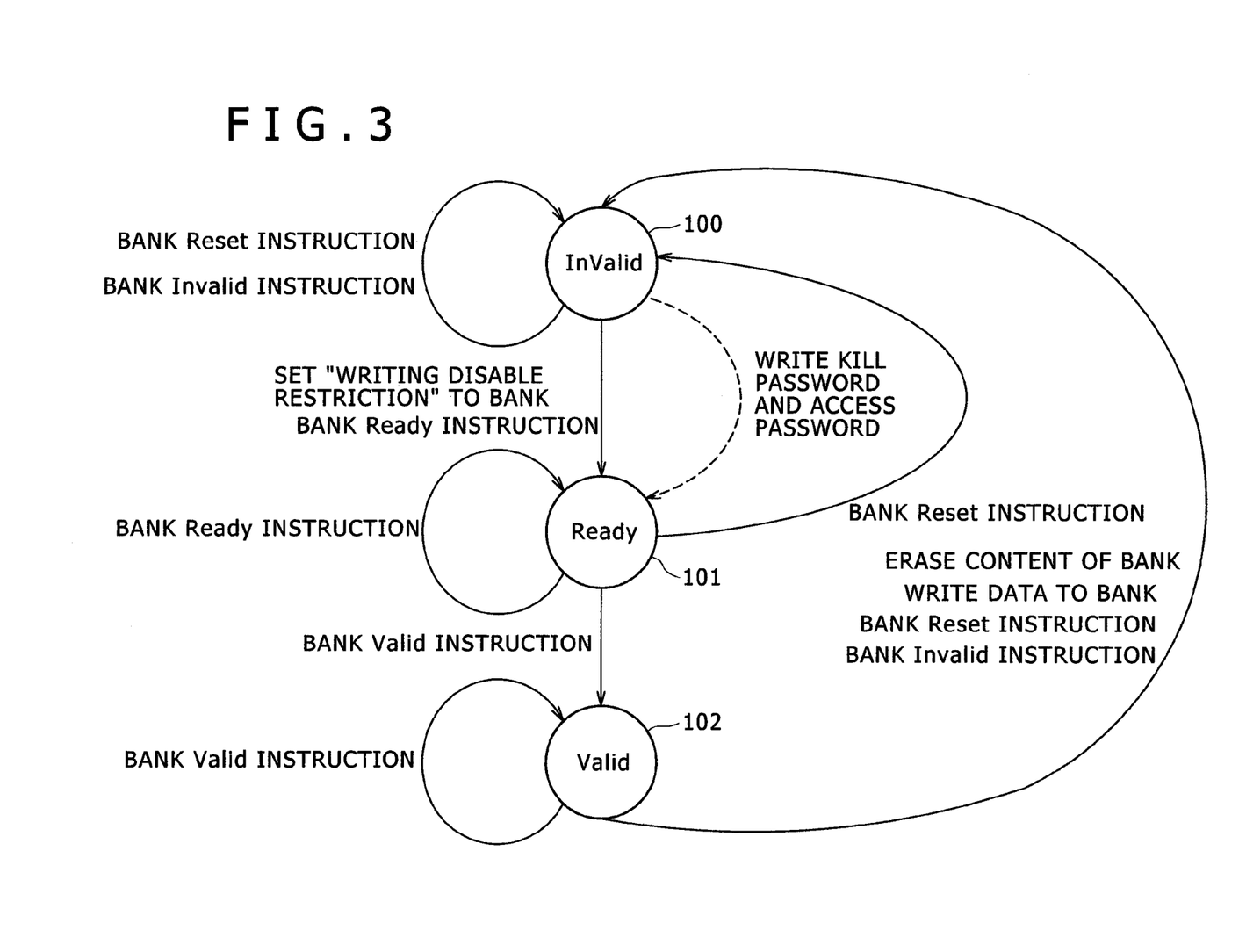
FIG. 3 is a diagram showing a state transition managed by a bank status.

FIG. 3 shows a state transition managed by the bank status 70. FIG. 3 collectively shows the state transition of the kill password 31, the kill PW status 71, the access password 32, the access PW status 72, the UII 41, the UII status 73, and each User area and each User area status of the user bank 60, as the managed objects and the bank statuses. Each bank status shows the following three states.

"Invalid" 100: the contents (data) of the corresponding bank (memory area) are invalid
"Ready" 101: the contents (data) of the corresponding bank (memory area) are valid
"Valid" 102: the contents (data) of the corresponding bank (memory area) are being used Although each bank status will be described as three states of the "Invalid" 100, "Ready" 101, and "Valid" 102, it is understood that the "Ready" 101 and "Valid" 102 are handled in the same state and can be controlled even with two states, such as "Invalid" 100 and "Valid" 102. In this case, "Invalid" 100 may be handled as the invalid state and "Valid" 102 may be handled as the valid state. Further, as in the life cycle management of the articles, in the application field that can be easily controlled to define the state in detail according to the time passage or the processing passage, it may be permitted to define more states.

The states of each bank status are changed by writing or erasing the data for the bank of the object from the controlling device 10, receiving the instruction to change the bank status of the object, and performing the instructions, etc., by the controlling circuit 23 of the electronic tag 21. An initial state of each bank status of the electronic tag 21 is "Invalid" 100 state.

When setting "writing disable restriction" to the bank of the object or performing the bank Ready instruction, the contents of the bank of the object from the "Invalid" 100 are effectively changed to "Ready" 101. When in the "Ready" 101 state, in the case of performing the bank Ready instruction, the "Ready" 101 state is maintained without changing the state.

For example, the UII status 73 writes necessary information from the controlling device 10 to the UII 41 and is changed from "Invalid" 100 to "Ready" 101 by setting the "writing disable restriction" to the area of the UII 41 using the access password 32 according to the protocol of ISO18000-6 Type C.

As a special example of the state transition from "Invalid" 100 to "Ready" 101, each of the kill PW status 71 and access PW status 72 is changed (a dotted line arrow of FIG. 3) from "Invalid" 100 to "Ready" 101 by writing each of the kill password 31 and access password 32.

When performing the bank Valid instruction, it is changed from "Ready" 101 to "Valid" 102 that is the state during using the contents of the bank of the object. When being in "Valid" 102 state, in the case of performing the bank Valid instruction, the "Valid" 102 state is maintained without changing the state.

In the case where the use of the contents of the bank of the object is complete and the contents (data) are invalid and the like, it is changed from "Valid" 102 to "Invalid" 100 by the bank Invalid instruction, in which the contents of the data writing to the bank or the erasing of the contents (data) of the bank is performed. When in the "Invalid" 100 state, in the case of performing the bank Invalid instruction, the "Invalid" 100 state is maintained without changing the state.

In order to make the contents of the bank of the object, which are in the "Ready" 101 or the "Valid" 102, forcibly invalid and change to the "Invalid" 100 state, the bank Reset instruction is installed. When being in the "Invalid" 100, in the case of performing the bank Reset instruction, the "Invalid" 100 state is maintained without changing the state.

Figure 4:
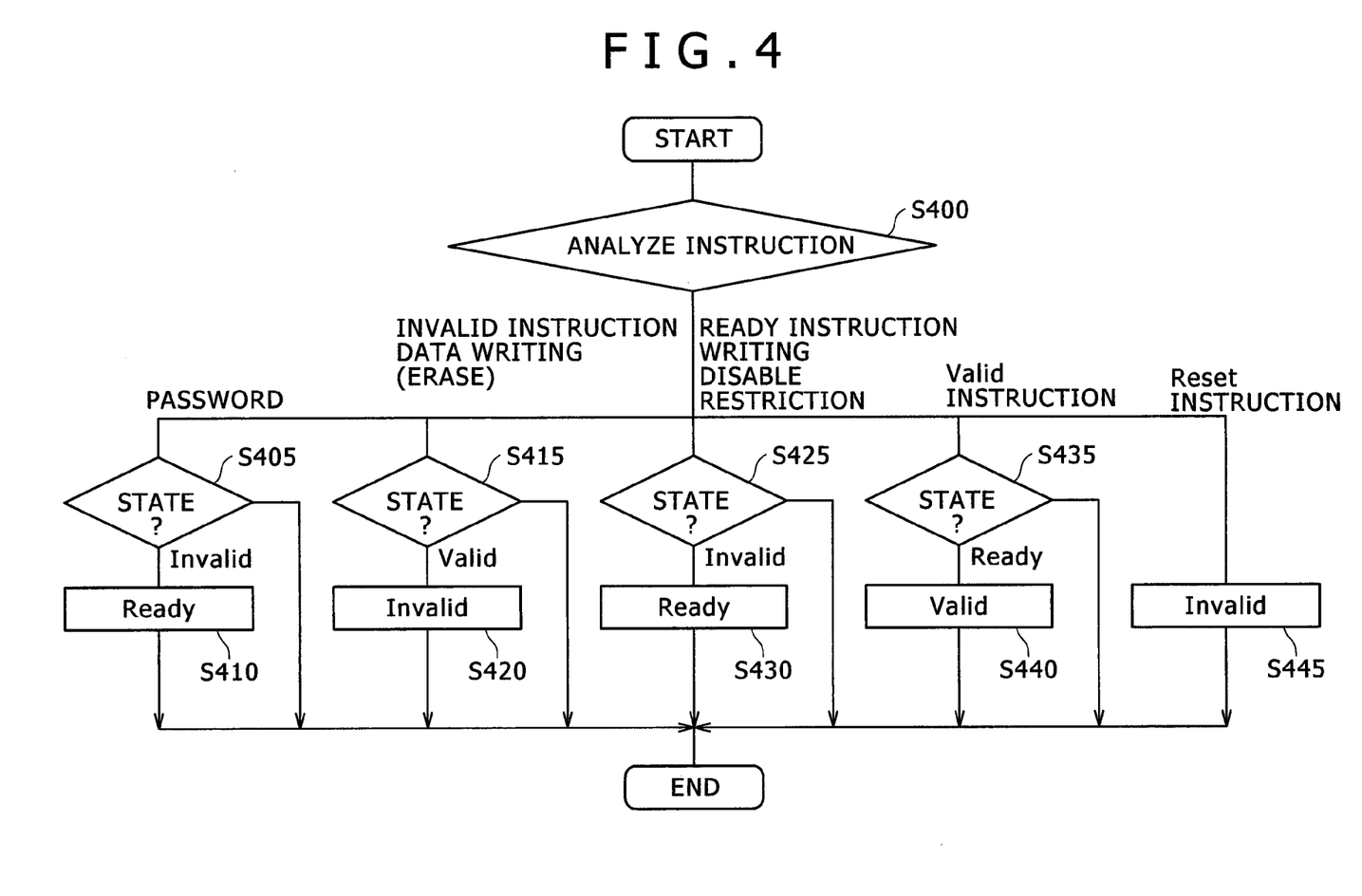
FIG. 4 is a process flow chart of a controlling circuit 23.

FIG. 4 shows a process flow chart of the controlling circuit 23 of the electronic tag 21 that is controlled according to the state transition diagram shown in FIG. 3. The instructions received from the controlling device 10 are analyzed (S400). As a result of the analysis, if the kill password 31 or the access password 32 is written and the kill PW status 71 or the access kill PW status 72 is "Invalid" 100 (S405), the kill PW status 71 or the access kill PW status 72 is changed to "Ready" 101 state (S410).

If the bank Invalid instruction or the data is written (erased) to the bank of the object and the bank status of the object is "Valid" 102 (S415), it is changed to the "Invalid" 100 (S420). If the bank Ready instruction or the writing disable restriction is set to the bank of the object and the bank status of the object is "Invalid" 100, it is changed to the "Ready" 101 (S430). If there is the bank Valid instruction to the bank of the object and the bank status of the object is the "Ready" 101 (S435), it is changed to "Valid" 102 (S440). If it is the bank Reset instruction to the bank of the object, the bank status of the object is changed to the "Invalid" 100 (S445). In the case where the conditions of each determination of S405, S415, S425, and S435, which are omitted in the description, are disabled, the process ends (the state is maintained).

Figure 5:
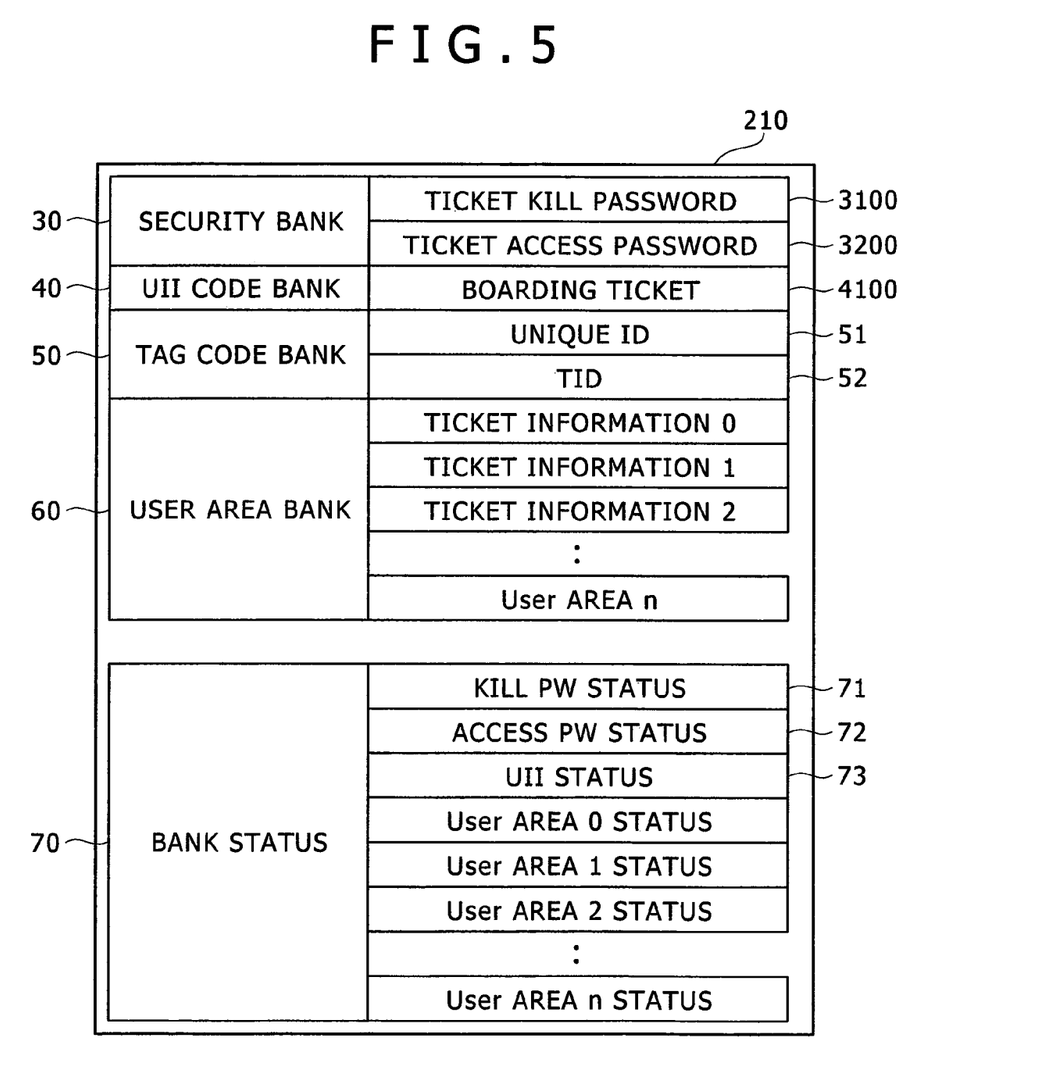
FIG. 5 is an example of bank contents of an electronic tag ticket.

FIG. 5 show an example of the bank contents (data arrangement) in the case where the electronic tag 21 having the bank status is applied to the electronic tag ticket 210. Each of the kill password 31 and access password 32 is used as a ticket kill password 3100 and a ticket access password 3200. The UII 41 is used as a boarding ticket 4100. The user areas 0 to 2 of the user area bank 60 are used as the storing area of ticket information 0 to 2.

Figure 6:
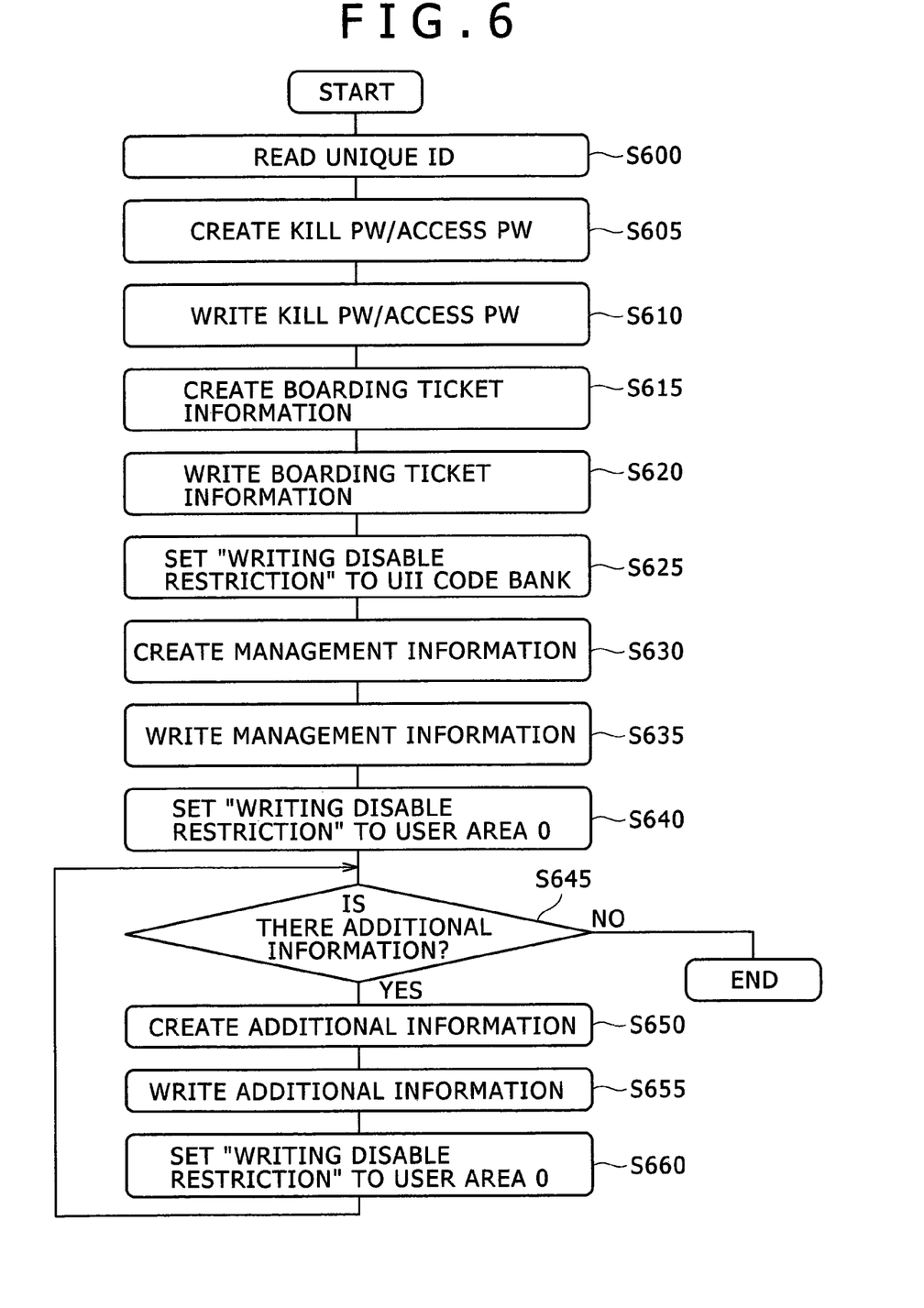
FIG. 6 is a process flow chart of generating data that are stored in a bank.

As an example of generating the data that are stored in each bank of the electronic tag ticket 210 shown in FIG. 5, FIG. 6 shows a process flow chart performed by the controlling device 10. Although the process of FIG. 6 may be configured to be performed by the controlling circuit 23 of the electronic tag 21, depending on the power amount fed by the power circuit 26, it is preferable to perform the process by the controlling apparatus 10 and to write the processed results in a predetermined bank by the controlling circuit 23 of the electronic tag 21. If there is no problem of the amount of fed power, then control is not limited thereto.

For simplicity, the ticket kill password 3100 and the ticket access password 3200 of FIG. 5 use the same value. A unique ID 51 of the electronic tag ticket 210 is read (S600). A predetermined calculation (for example, the unique ID 51 is encrypted using the dedicated key k as the encrypting key. However, the dedicated key k and the predetermined calculation is not required according to applications) is performed by the unique ID 51 read as the dedicated key k to be used as the ticket (S605) and the execution results are written in the electronic tag ticket 210 as the ticket kill password 3100 and the ticket access password 3200 (S610). If the ticket kill password 3100 and the ticket access password 3200 are written, each of the kill PW status 71 and the access PW status 72 is changed to "Ready" 101 according to the state transition of FIG. 3. The unique ID 51 is different for each electronic tag ticket 210 and the ticket kill password 3100 and the ticket access password 3200 are also different for the electronic tag ticket 210 accordingly.

The predetermined calculation (for example, the boarding ticket information is encrypted using the ticket kill password 3100 as the encryption key) is performed using the boarding ticket information (an valid period (start), an valid period (end), a boarding section (start), a boarding section (end)) and the value generated as the ticket kill password 3100 (S615) and the execution results are stored in the UII code bank 40 of the electronic tag ticket 210 as the boarding ticket 4100 (S620). The corresponding UII status 73 is changed to "Ready" 101 by setting the "writing disable restriction" using the ticket access password 3200 for the UII code bank 40 (S625).

The boarding ticket information (a valid period (start), a valid period (end), a boarding section (start), a boarding section (end)) accompanies the management information and the additional information if necessary. The management information is information that relates to the boarding ticket issue such as an access number, a ticket database number, a ticket issuing day and time, a ticket issuing user ID, and the like and information used at the time of a loss of the electronic tag ticket 210, the reissuing of the electronic tag ticket 210 and the like. At this time, the additional information is additional ticket information such as an express ticket corresponding to the boarding ticket, a reserved-seat ticket and the like. There are additional information 1 (an express number: A, a (express A) ticket section (start), a (express A) boarding section (end), presence and absence of a (express A) reserved seat, a (express A) seat number) and additional information 2 (an express number: B, a (express B) boarding section (start), a (express B) boarding section (end), presence and absence of a (express B) reserved seat, a (express B) seat number).

The predetermined calculation (for example, the management information is encrypted using the ticket kill password 3100 as the encryption key) is performed using the management information that relates to the boarding ticket issue such as an access number, a boarding ticket database number, a ticket issuing day and time, a ticket issuing user ID, and the like and the value that is generated as the ticket kill password 3100 (S630) and the execution results are stored in the User area 0 of the electronic tag ticket 210 as the ticket information 0 (S635). The corresponding User area 0 status is changed to "Ready" 101 by setting the "writing disable restriction" for the User area 0 (S640). In place of setting the "writing disable restriction" (S640), the bank Ready instruction may also be used. Further, if there is no the problem in the security, the predetermined calculation such as the encryption is not limited according to the applications.

It is determined whether there is additional information (S645). If there is no additional information, the process ends. At this time, there are additional information 1 and additional information 2.

The predetermined calculation (for example, the additional information 1 is encrypted using the ticket kill password 3100 as the encryption) is performed by using the additional information (an express number: A, a (express A) ticket section (start), a (express A) boarding section (end), presence and absence of a (express A) reserved seat, a (express A) seat number) and the value generated as the ticket kill password 3100 (S650) and the execution results are stored in the User area 1 of the electronic tag ticket 210 as the ticket information 1 (S655). The corresponding User area 1 status is changed to "Ready" 101 by setting the "writing disable restriction" using the ticket access password 3200 for the User area 1 (S660). In place of setting the "writing disable restriction" (S660), the bank Ready instruction may also be used.

Even in the case of the additional information 2 (an express number: B, a (express B) boarding section (start), a (express B) boarding section (end), presence and absence of a (express B) reserved seat, a (express B) seat number), likewise the process on the additional information 1, the creation of the ticket information 2 (S650), the storing of the ticket information 2 (S655), and the User area 2 status are changed to "Ready" 101 (S660).

By the above processes, the predetermined information is stored in the electronic tag ticket 210 shown in FIG. 5, the bank status corresponding to the bank storing the information is "Ready" 101, and the electronic tag ticket 210 can be used by the user.

Figure 7:
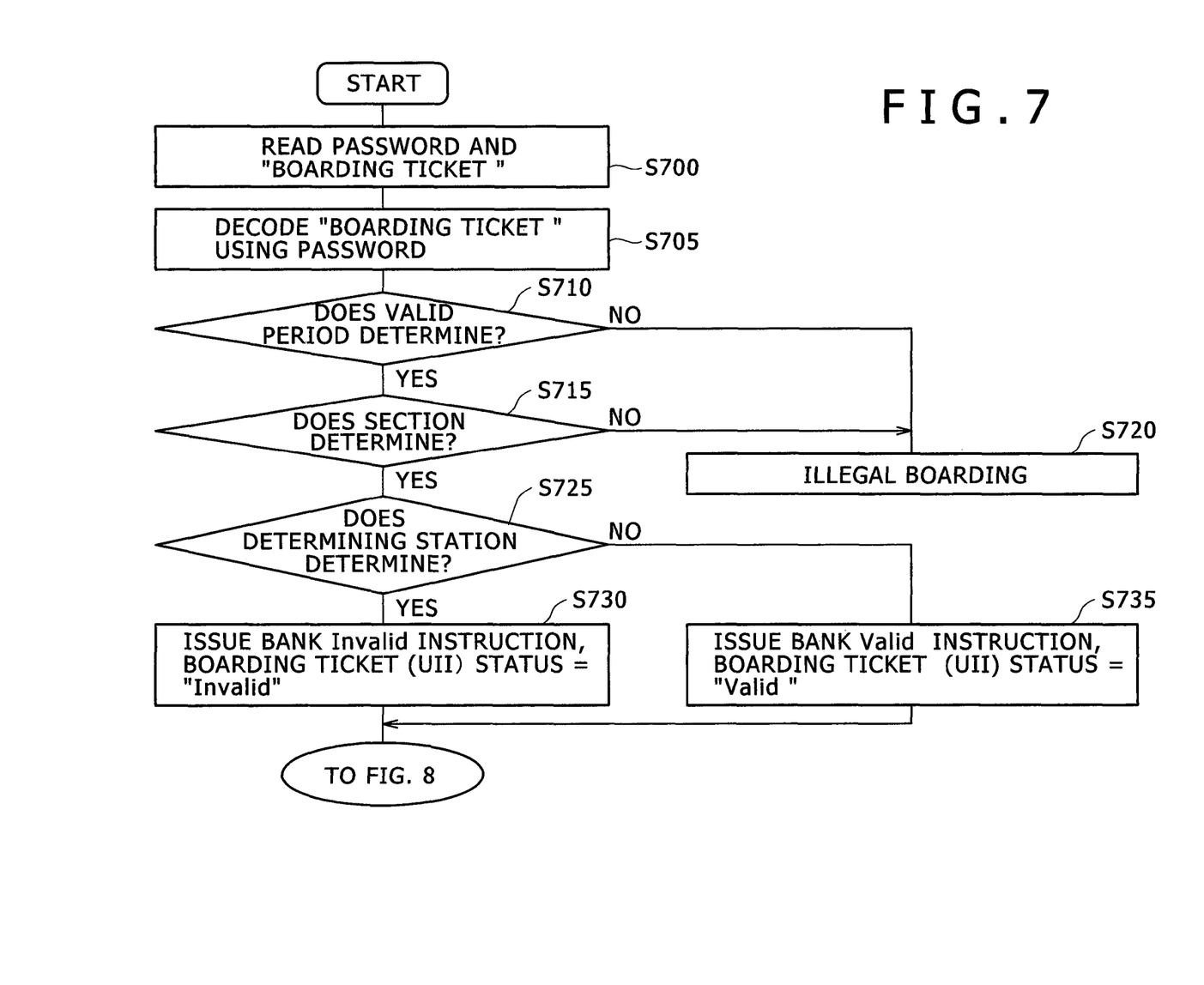
FIG. 7 is a process flow chart that is executed in a controlling device.
Figure 8:
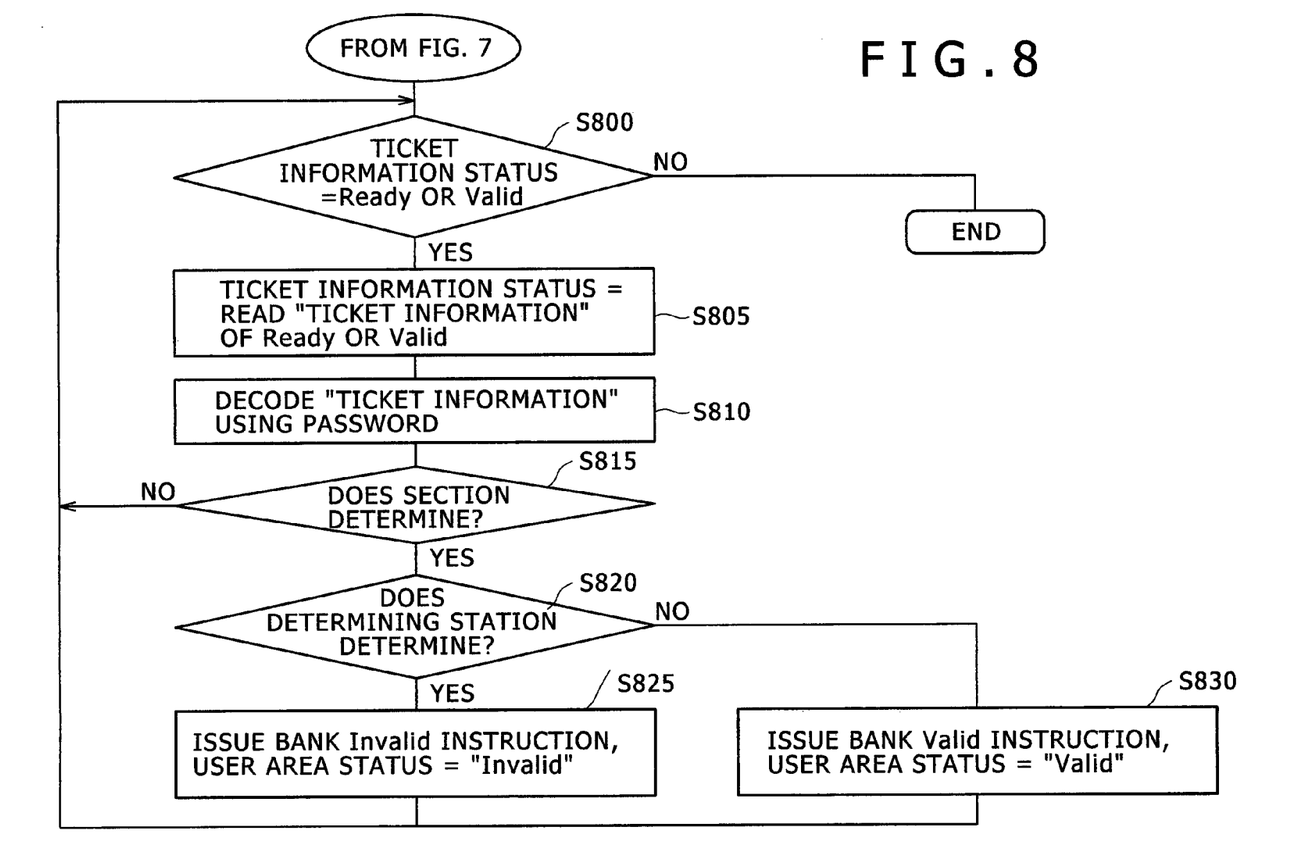
FIG. 8 is a process flow chart that is executed in the controlling device.

The transition in the state where the electronic tag ticket 210 issued by the process of FIG. 6 is stored in the bank status of the electronic tag ticket 210 according to the process used by the user will be described. FIGS. 7 and 8 are processing flow charts performed in the controlling device 10. According to the use process of the electronic tag ticket 210 by the user, the controlling device 10 is, for example, (1) the ticket gate of the entraining station (it is considered to be different from the entraining station of the express A), (2) the ticket gate for the express of the entraining station of the express A, (3) the ticket inspector of the express A, (4) the ticket gate of the entraining station from the express A to the express B, and (5) the ticket gate of the detraining station (it is considered to be the same as the detraining station of the express B). It will be apparent from the following description that the information on the installation place of the controlling device 10 is important information in determining the time passage and the processing passage.

(1) The Ticket Gate of the Entraining Station (it is Considered to be Different from the Entraining Station of the Express A)

In the ticket gate of the entraining station (controlling device 10), the boarding ticket 4100 and the ticket kill password 3100 of the electronic tag ticket 210 are read (S700). The boarding ticket 4100 is decoded by using the ticket kill password 3100 (S705). As described using FIG. 6, there is a method of obtaining the value corresponding to the ticket kill password 3100 using the dedicated key k by reading the unique ID 51. In this case, it is not necessary to perform the encryption using the ticket kill password 3100 at the time of issuing the electronic tag ticket 210. Whether to select any method depends on the security of the electronic tag ticket 210.

The valid period of the decoded boarding ticket is determined (S710). The section is determined (S715). The case where the ticket does not meet the valid period or the boarding section is processed as an illegal boarding (S720). The boarding section (end) of the boarding ticket determines whether the ticket gate is installed in the station or not (S725). Herein, there is the ticket gate in the entraining station, the bank Valid instruction is transmitted to the electronic tag ticket 210 (S735) and the boarding ticket (UII) status 73 is changed to the "Valid" state.

Next, the ticket information status of the electronic tag ticket 210 is read to determine whether there is the ticket information of the "Ready" 101 state or the "Valid" 102 state (S800). Herein, by the process of FIG. 5, the User areas 0 to 2 statuses, which are the bank status corresponding to the ticket information 0 to 2, become the "Ready" 101 state and the others are the "Invalid" 100 state. Although not shown and described, since the management information is stored in the ticket information 0, the contents of the ticket information 1 are read by a skip (S805). The contents of the ticket information 1 are decoded using the ticket kill password 3100 (S810). The contents of the decoded ticket information 1 are the express ticket of the express A, but since the entraining station is out of the boarding section of the express A, are returned to S800. The contents of the ticket information 2 are read (S805) as the ticket information of the subsequent "Ready" 101 state or "Valid" 102 state (S800). The contents of the ticket information 2 are decoded using the ticket kill password 3100 (S810). The contents of the decoded ticket information 2 are the express ticket of the express B, but since the entraining station is out of the boarding section of the express B, are returned to S800. Since there is no other ticket information of the "Ready" 101 state or "Valid" 102 state (S800), the process ends.

Also, steps S800 and S805 show that the same process can be performed on the "Ready" 101 state and "Valid" 102 state even in the case where the above-mentioned state is two states of the "Invalid" 100 state and the "Valid" 102 state.

(2) Ticket Gate for Express of Entraining Station of Express A

In the ticket gate (controlling device 10) of the entraining station of the express A, the boarding ticket of the electronic tag ticket 210 is checked according to steps S700 to S735, similar to case (1). The ticket information status of the electronic tag ticket 210 is read to determine whether there is the ticket information of the "Ready" 101 state or the "Valid" 102 state (S800). Since the User area 1 status is the "Ready" 101 state, the contents of the ticket information 1 are read (S805). The contents of the ticket information 1 are decoded by using the ticket kill password 3100 (S810). Since the contents of the decoded ticket information 1 are the express ticket of the express A and the boarding section (entraining station) of the express A (S815 and S820), the bank Valid instruction is issued to the User area status 1, changed to the "Valid" 102 status (S830), and returned to S800. The contents of the ticket information 2 are read (S805) as the ticket information of the subsequent "Ready" 101 state or "Valid" 102 state (S800). The contents of the ticket information 2 are decoded using the ticket kill password 3100 (S810). The contents of the decoded ticket information 2 are the express ticket of the express B, but since the entraining station of the express A is out of the boarding section of the express B, are returned to S800. Since there is no the ticket information of the "Ready" 101 state or "Valid" 102 state (S800), the process ends. Although the drawings and description of the validity of the express ticket regarding the reserved seat and the like are omitted, it can be easily understood.

(3) Ticket Inspector of Express A

Since the process in the ticket inspector (controlling device 10) of the express A is the boarding section of the express A, it is the same as the process of the case of the ticket gate for the express of the entraining station of the (2) express A and therefore, the description thereof will not be repeated.

(4) Ticket Gate of Entraining Station from Express a to Express B

In the ticket gate (controlling device 10) of the entraining station from the express A to the express B, the boarding ticket of the electronic tag ticket 210 is checked according to processes S700 to S735 similar to case (1). The ticket information status of the electronic tag ticket 210 is read to determine whether there is the ticket information of the "Ready" 101 state or the "Valid" 102 state (S800). Since the User area 1 status is the "Valid" 102 state, the contents of the ticket information 1 are read (S805). The contents of the ticket information 1 are decoded by using the ticket kill password 3100 (S 810). Since the contents of the decoded ticket information 1 are the express ticket of the express A and the boarding section (detraining station) of the express A (S815 and S820), the bank Valid instruction is issued to the User area status 1, changed to the "Invalid" 100 state (S825), and returned to S800. The contents of the ticket information 2 are read (S805) as the ticket information of the subsequent "Ready" 101 state or "Valid" 102 state (S800). The contents of the ticket information 2 are decoded using the ticket kill password 3100 (S810). Since the contents of the decoded ticket information 2 are the express ticket of the express B and are the boarding section (entraining station) of the express B, the bank Valid instruction is issued to the User area status 2, changed to the "Invalid" 102 state (S830), and returned to S800. Since there is no other ticket information of the "Ready" 101 state or "Valid" 102 state (S800), the process ends.

(5) Ticket Gate of Detraining Station (the Same as the Detraining Station of the Express B)

In the ticket gate (controlling device 10) of the detraining station (the same as the detraining station of the express B), the ticket kill password 3100 and the boarding ticket 4100 of the electronic tag ticket 210 are read (S700). The boarding ticket 4100 is decoded using the ticket kill password 3100 (S705). The valid period of the decoded boarding ticket is determined (S710) and the section thereof is determined (S715). The case where the boarding ticket is out of the valid period or the section is processed as an illegal boarding (S720). The boarding section (end) of the ticket determines whether the ticket gate is installed at the station or not (S725). At this time, since it is the detraining station, the bank Invalid instruction is transmitted to the electronic tag ticket 210 (S730) and the boarding ticket (UII) status 73 is changed to the "Invalid" state. The ticket information status of the electronic tag ticket 210 is read to determine whether there is the ticket information of the "Ready" 101 state or the "Valid" 102 state (S800). The User area 1 status is the "Invalid" 100 state. The contents of the ticket information 2 are read (S805). The contents of the ticket information 2 are decoded by using the ticket kill password 3100 (S810). Since the contents of the decoded ticket information 2 are the express ticket of the express B and the boarding section (detraining station) of the express B, the bank Invalid instruction is issued to the User area status 2 (S830), changed to the "Invalid" 100 state, and returned to S800. Since there is no other ticket information of the "Ready" 101 state or "Valid" 102 state (S800), the process ends. By the above-mentioned description, each bank status is changed to the "Invalid" 100 state.

Since the process flows shown in FIGS. 7 and 8 are performed by the controlling device 10, the controlling device 10 according to the above-mentioned description can be operated as the ticket gates of each station or the ticket inspector within a vehicle.

With the first embodiment, the elapse (transition) of the time and process where the meanings of the information (boarding ticket information, express ticket information) are changed can be managed as the bank status.

Second Embodiment

The second embodiment has the selector bank 80 shown in FIG. 2 and viewing from the controlling device 10, the selector bank 80 is configured to be logically read as the contents of the predetermined bank, but physically provide plural physical areas corresponding to the logical bank, control the selector based on the control information that is stored as the select information of the selector bank 80, and read the contents of any one of the plural physical areas.

Figure 9:
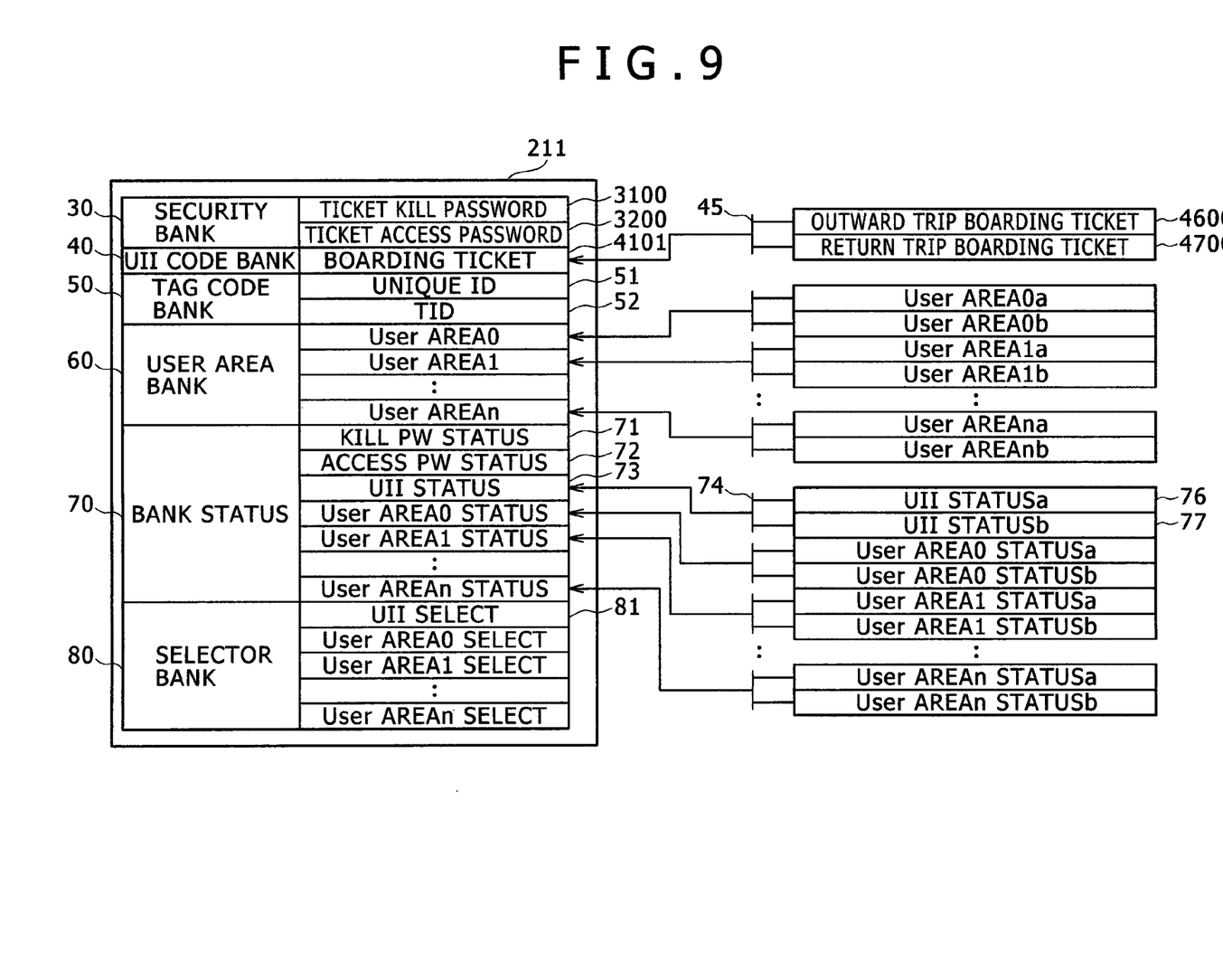
FIG. 9 is a view showing an example of bank contents when applied to an electronic tag ticket (round-trip boarding ticket)

FIG. 9 has the bank status 70 and shows an electronic tag ticket 211 that is issued as a round-trip boarding ticket by making each of the UII code bank 40 and user area bank 60 into a two-plane. Herein, since it is the round-trip boarding ticket and the user area bank 60 is not used, the areas of the user area 0 to n selectors of the corresponding selector bank 800 may be mounted or may not be mounted.

The issue of the round-trip boarding ticket can be realized by repeating the processes from S615 to S625 of FIG. 6 that are process flows executed by the controlling device 10 issuing the electronic tag ticket 211 according to the contents of the selector. If the controlling device 10 sets the UII selector 81 to "a", the are of the outward trip boarding ticket 4600 as the boarding ticket 4101 and the area of the UII status a 76 as the UII status 73 are each selected by the selectors 45 and 74. In this state, if the processes from S615 to S625 of FIG. 6 are executed, the information of the outward trip boarding ticket is written in the area of the outward trip boarding ticket 4600 and the "Ready" 101 state is set in the area of the UII status a76. Continuously, if the controlling device 10 sets the UII selector 81 to "b", the area of the return trip boarding ticket 4700 area as the boarding ticket 4101 and the area of the UII status b77 as the UII status 73 are each selected by the selectors 45 and 74. In this state, if the processes from S615 to S625 of FIG. 6 are executed, the information of the outward trip boarding ticket is written in the area of the return trip boarding ticket 4700 and the "Ready" 101 state is set in the area of the UII status b77. Hereinafter, the controlling device 10 sets the UII selector 81 to "a". The description of other processes is the same as the description of the first embodiment. Although the description of the setting of the UII selector 81 is omitted, it is realized by writing the value of the select from the controlling device 10.

The situations where the issued electronic tag ticket 211 is used by the user will be described using FIG. 7 with respect to the boarding ticket as an example of operating the controlling device 10 as (1) the ticket gate of the outward trip entraining station, (2) the ticket gate of the outward trip detraining station, (3) the ticket gate of the return trip entraining station, and (4) the ticket gate of the return trip detraining station.

(1) Ticket Gate (Controlling Device 10) of Outward Trip Entraining Station

In the ticket gate (controlling device 10) of the entraining station, the ticket kill password 3101 and the boarding ticket 4101 of the electronic tag ticket 211 are read (S700). At this time, since the UII selector is set to "a", what is read as the boarding ticket 4101 is the information of the outward trip boarding ticket of the area of the outward trip boarding ticket 4600 area. The boarding ticket 4101 is decoded by using the ticket kill password 3101 (S705). The valid period of the decoded boarding ticket is determined (S710) and the boarding section is determined (S715). The case where the boarding ticket is past the valid period, or the boarding section is processed as an illegal boarding and the like (S720). The boarding section (end) of the boarding ticket determines whether the ticket gate is installed at the station or not (S725). Herein, since it is the ticket gate in the station, the bank valid instruction is transmitted to the electronic tag ticket 211 (S735) and the boarding ticket (UII) status 73 is changed from the "Ready" 101 state to the "Valid" 102 state. Since the UII selector is set to "a", one that stores the "Valid" 102 state as the boarding ticket (UII) status 73 is the physical area of the UII status a76.

(2) Ticket Gate (Controlling Device 10) of Outward Trip Entraining Station

The description of each process of S700 to S720 repeats the contents described in the first embodiment 1 or the above (1) and therefore, the description thereof will not be repeated. Since it is the outward trip detraining station (S725), the boarding ticket (UII) status 73 is changed from the "Valid" 102 state to "Invalid" 100 state by transmitting the bank Invalid instruction to the electronic tag ticket 211 (S730). Since the UII selector is set to "a", one that stores the "Invalid" 100 state as the boarding ticket (UII) status 73 is the physical area of the UII status 76. In the second embodiment, the UII selector is set to "b" in the process of S730.

(3) Ticket Gate (Controlling Device 10) of the Return Trip Entraining Station, and (4) Ticket Gate (Controlling Device 10) of the Return Trip Detraining Station The operations of the ticket gate of the return trip entraining station, and the ticket gate of the return trip detraining station is the same as the operations of the above (1) and (2) except that since the UII selector is set to "b", the return trip boarding ticket 4700 and the UII status b77 are selected by the selectors 45 and 74, and therefore, the description thereof will not be repeated.

With the second embodiment, one electronic tag ticket 211 can be used as the round-trip boarding ticket. As a result, by switching (selecting) by the selector, a portion of the plural pieces of information is different but the plural pieces of information, which is the same kind, can be included in one electronic tag.

Third Embodiment

A third embodiment relates to the electronic tag 21 that has the counter bank 90 shown in FIG. 2 and repetitively uses the information stored in the bank managed by the counter.

Figure 10:
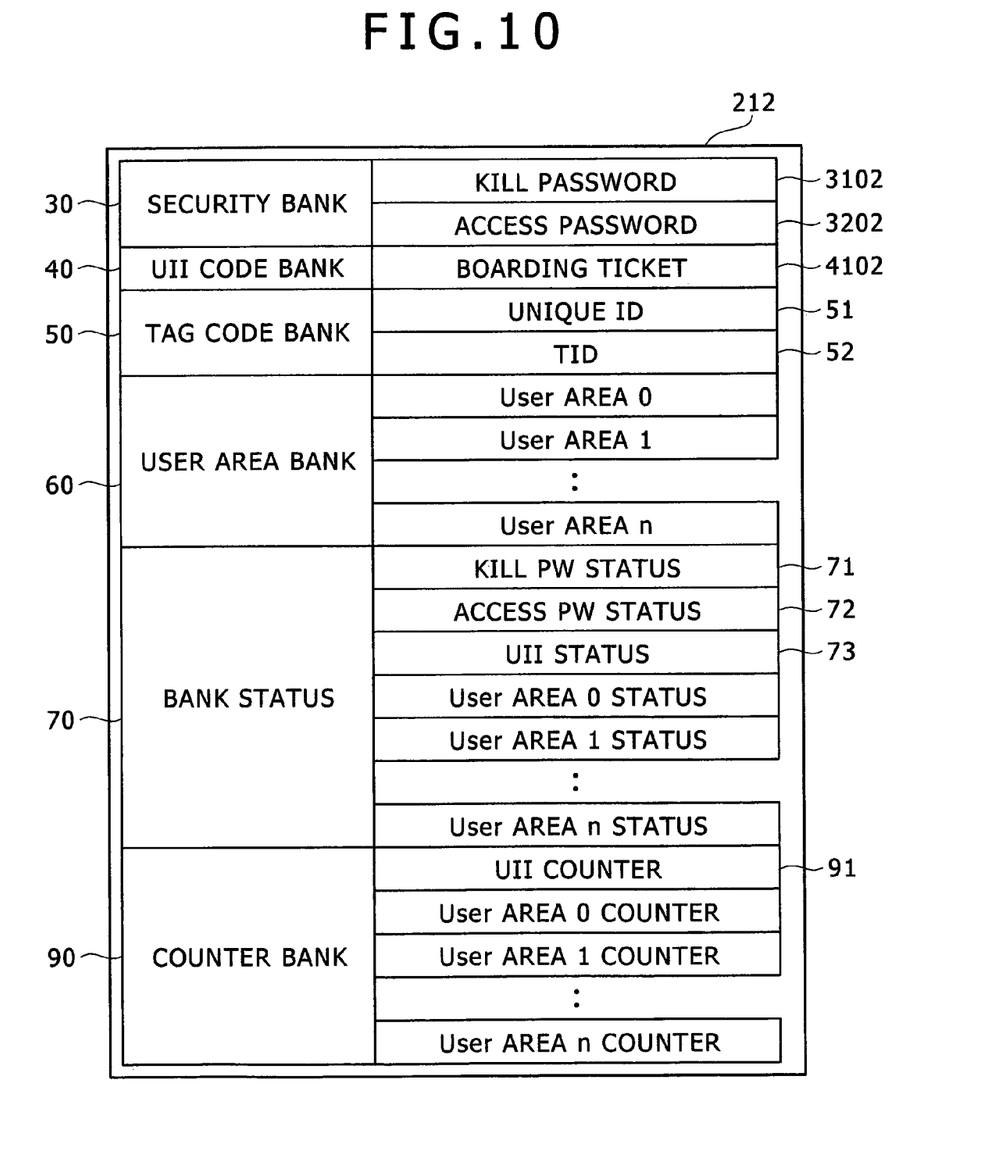
FIG. 10 is an example of bank contents when being applied to an electronic tag ticket (boarding coupon ticket).

FIG. 10 shows an electronic tag ticket 212 that has the counter bank 90 and issued as the boarding coupon ticket that can repetitively use each of the UII code bank 40 and the user area bank 60. Herein, since it is the boarding coupon ticket and the user area bank 60 is not used, the areas of the User area 0 to n counters of the corresponding counter bank 90 may be mounted and may not be mounted.

The issue of the boarding coupon ticket can be realized by adding the process for the counter during the processes from S615 to S625 of FIG. 6 that are process flows executed by the controlling device 10 issuing the electronic tag ticket 212. If the processes from S615 to S625 of FIG. 6 are executed, the boarding ticket information 4102 is written in the UII code bank 40, and the "Ready" 101 status is set to the area of the UII status 73. Then, as the additional process, the controlling device 10 sets the number of times used of the boarding coupon ticket to the UII counter 91.

The situations where the electronic tag ticket 212 of the boarding coupon ticket issued by the above description is used by the user will be described using FIG. 7 with respect to the boarding ticket as an example of operating the controlling device 10 as (1) the ticket gate of the entraining station and (2) the ticket gate of the detraining state.

(1) Ticket Gate of Entraining Station (Controlling Device 10)

The process in the ticket gate (controlling device 10) of the entraining station is the same as the first embodiment. The ticket kill password 3102 and the boarding coupon ticket 4102 of the electronic tag ticket 212 are read (S700). The boarding ticket 4102 is decoded by using the ticket kill password 3102 (S705). The valid period of the decoded boarding coupon ticket is determined (S710) and the boarding section is determined (S715). The case where the boarding coupon ticket is past the valid period, or the boarding section is processed as an illegal boarding and the like (S720). The boarding section (end) of the boarding coupon ticket determines whether the ticket gate is installed at the station or not (S725). Herein, the boarding coupon ticket (UII) status 73 transmits the bank Valid instruction as being the entraining station from on showing the "Ready" 101 state to the electronic tag ticket 212 (S735) and is changed from the "Ready" 101 state to the "Valid" 102 state.

(2) Ticket Gate (Controlling Device 10) of Detraining Station

The description of each process of S700 to S720 repeats the contents described in the first embodiment or the above (1) and therefore, the description thereof will not be repeated. The difference between the third embodiment and the first embodiment is a process after it is determined to be the detraining station (S725). Although not shown, if it is the detraining station, the subtraction process (count down), which subtracts 1 from the value stored in the boarding coupon ticket (UII) counter 91 is performed and the subtraction result is stored in the boarding coupon ticket (UII) counter 91. If the subtraction result is 0 (used effective recovery setting the boarding coupon ticket), the bank Invalid instruction is transmitted to the electronic tag ticket 212 (S730). Upon entraining, the boarding coupon ticket (UII) status 73 is changed from "valid" 102 state to "Invalid" state and if the subtraction result is not 0, the bank Valid instruction is transmitted to the electronic tag ticket 212 to make (maintain) the boarding coupon ticket (UII) status 73 into the "Valid" 102 state. Further, the bank Ready instruction is transmitted to the electronic tag ticket 212, making it possible to change the boarding coupon ticket (UII) status 73 to the "Ready" 101 state. The reason for changing to the "Ready" 101 state is that the "Ready" 101 state is handled similarly to the "Valid" 102 state as described above.

With the third embodiment, one electronic tag ticket 212 can be used as the boarding coupon ticket and the electronic tag, which can repeatedly use the same information, can be realized according to the control by the counter.

What is claimed is:

1. An electronic tag system comprising:
   an electronic tag that includes a memory having a divided bank and a bank status that stores a status of data stored in the divided bank, and a controlling circuit that reads and writes the data from and to the bank and changes the status; and
   a controlling device that allows the controlling circuit connected through the electronic tag and an electronic reader/writer to transmit and receive the read and written data from and to the bank and to issue an instruction to change the status.

2. The electronic tag system according to claim 1, wherein the status indicates a state of the data stored in the bank, the state being at least a state where the data is valid and a state where the data is invalid.

3. The electronic tag system according to claim 2, wherein the controlling device refers to the data stored in the bank and information of a place where the controlling device is installed to issue an instruction to change the status.

4. The electronic tag system according to claim 3, wherein the controlling circuit in response to the instruction to change the status, changes the status according to the state of the data stored in the bank where the status is indicated.

5. The electronic tag system according to claim 2, wherein the memory further includes a plurality of data storing physical areas corresponding to the bank, a selector bank that stores control information to select any one from the plurality of data storing physical areas, and a selector that selects any one of the plurality of data storing physical areas based on the control information stored in the selector bank, the controlling circuit making the data stored in the data storing physical area selected by the selector the data stored in the bank.

6. The electronic tag system according to claim 2, wherein the memory is further provided with a counter bank that stores count values corresponding to the bank and the controlling device refers to the count values stored in the counter bank and when the count value exceeds a previously set valid count value, issues the instruction to change the status of the bank to the status indicating the state where the data stored in the bank is invalid.

7. An electronic tag comprising:
   a memory having the divided bank and a bank status that stores a status of data stored in the divided bank; and
   a controlling circuit that performs reading and writing of the data from and to the bank in response to reading and writing of the data from a controlling device to the bank and changes the status stored in the bank status in response to an instruction to change the status.

8. The electronic tag according to claim 7, wherein the status indicates a state of the data stored in the bank, the state being at least a state where the data is valid and a state where the data is invalid.

9. The electronic tag according to claim 8, wherein the controlling circuit in response to the instruction to change the status, changes the status according to the state of the data stored in the bank where the status is indicated.

10. The electronic tag according to claim 8, wherein the memory further includes a plurality of data storing physical areas corresponding to the bank, a selector bank that stores control information to select any one from the plurality of data storing physical areas, and a selector that selects any one of the plurality of data storing physical areas based on the control information stored in the selector bank, the controlling circuit making the data stored in the data storing physical area selected by the selector the data stored in the bank.

11. The electronic tag according to claim 8, wherein the memory is further provided with a counter bank that stores count values corresponding to the bank and when the count value stored in the count bank exceeds a previously set valid count value, the controlling circuit changes the status stored in the bank status in response to the instruction that changes the status of the bank.

12. A method of controlling an electronic tag comprising:
    using a memory having a divided bank and a bank status that stores a status of data stored in the divided bank;
    performing reading and writing of the data from and to the bank in response to an instruction of reading and writing of the data from a controlling device to the bank; and changing the status stored in the bank status according to the state of the data stored in the bank where the status is indicated in response to an instruction to change the status from the controlling device.

13. The method of controlling an electronic tag according to claim 12, wherein the status indicates the state of the data stored in the bank, the state being at least a state where the data is valid and a state where the data is invalid.

14. The method of controlling an electronic tag according to claim 13, wherein the memory further includes a plurality of data storing physical areas corresponding to the bank and a selector bank that stores control information to select one from the plurality of data storing physical areas to select any one of the plurality of data storing physical areas based on the control information stored in the selector bank and to make the data stored in the selected data storing physical area the data stored in the bank.

15. The method of controlling an electronic tag according to claim 13, wherein the memory is further provided with a counter bank that stores count values corresponding to the bank and the until the count value stored in the count bank reaches a previously set valid count value, the status of the bank maintains a state where the data is valid.

* * * * *